(12) United States Patent
McGregor

(10) Patent No.: US 6,641,778 B2
(45) Date of Patent: Nov. 4, 2003

(54) DEVICE AND METHOD FOR REGULATING FLOW OF PARTICULATE MATERIAL, ESPECIALLY SMALL FLOWS OF FINE POWDER

(75) Inventor: Gavin McGregor, London (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/858,554

(22) Filed: May 17, 2001

(65) Prior Publication Data
US 2002/0171183 A1 Nov. 21, 2002

(51) Int. Cl.[7] ................................................ C21C 7/00
(52) U.S. Cl. .................... 266/216; 222/590; 222/591
(58) Field of Search ................................ 222/591, 590; 266/216

(56) References Cited

U.S. PATENT DOCUMENTS

| | | | | |
|---|---|---|---|---|
| 3,520,447 A | * | 7/1970 | Hawk, Sr. ..................... 222/46 |
| 4,546,902 A | * | 10/1985 | Anderson ................. 222/129.2 |
| 4,756,647 A | * | 7/1988 | Fassbinder .................. 406/131 |
| 4,941,778 A | * | 7/1990 | Lehmann ..................... 406/28 |
| 5,304,771 A | | 4/1994 | Griffin et al. .......... 219/121.63 |
| 5,487,624 A | * | 1/1996 | Toyota et al. .................. 406/14 |
| 5,538,162 A | * | 7/1996 | Reh et al. ..................... 222/63 |
| 5,800,867 A | | 9/1998 | Matsunaga et al. .......... 427/236 |
| 6,098,677 A | | 8/2000 | Wegman et al. ............. 141/256 |

FOREIGN PATENT DOCUMENTS

| WO | WO 00/28110 | 5/2000 |
|---|---|---|
| WO | WO 00/30763 | 6/2000 |

* cited by examiner

Primary Examiner—Scott Kastler
(74) Attorney, Agent, or Firm—G. Ronald Bell (57) ABSTRACT

A device for regulating the flow of particulate material comprising a first, inlet conduit having an outlet end, and a second, outlet conduit aligned with the first conduit and having an inlet end sufficiently close to the outlet end of the first conduit as to receive at least a portion of a particulate material flow exiting the first conduit. The lateral relationship of the adjacent ends of the two conduits is adjusted to change the area of the inlet end exposed to material leaving the first conduit to adjust the flow of particulate material through the second conduit; material which does not enter the second conduit is recycled. The device is particularly useful for regulating the flow of small quantities of metal powder being fed to a laser consolidation process. The invention also includes the method of regulating by lateral adjustment of the adjacent conduit ends.

18 Claims, 7 Drawing Sheets

Fig.1a section

DEVICE AND METHOD FOR REGULATING FLOW OF PARTICULATE MATERIAL, ESPECIALLY SMALL FLOWS OF FINE POWDER

BACKGROUND OF THE INVENTION

1. Field of the Invention

The present invention relates to the regulation of the flow of particulate material, especially fine powder used in certain metallurgical processes. A special purpose of the invention is the regulation of the flow of a fine stream of metal powder to the focal point of a laser beam which is part of a process for building metal articles. Such processes, variously referred to as a "consolidation process", "laser sintering", "precision laser welding" or "layered deposition", are used for making turbine blades and other parts of special shape which are difficult to make by other means.

2. Prior Art

While many valves and flow regulators have been designed for controlling flow of particulate materials, none are known to Applicants which can accurately control flow when small volumes of fine powder such as are required for the consolidation type processes referred to above. These need flow rates of less than 7 cubic centimeters per minute, and often much less, down to a fraction of 1 cc per minute, and the flow rate needs to be changed quickly and smoothly. Commercial devices tend to have flow rates more than ten times what is required for the consolidation process.

Most known systems for powder flow control meter the powder from a hopper in an attempt to get it to flow in a continuous stream at a required rate. Hitherto, in the consolidation process, two commercial systems have been used. In one case the powder is metered by a rotating auger, then transported by pressurized inert gas through tubing to a nozzle that injects the powder into the molten pool. In the second, an aspirator system is used to pull the powder into a gas stream through a venturi. Generally, these and other systems require that the powder be transported to the consolidation head which is some distance from the point at which metering occurs; this leads to time lags between making an adjustment and achieving a new settled flow rate, so that the results are erratic. The systems cannot be used reliably for small flows. Also, after the systems have been adjusted to give a constant flow rate, it is not possible to quickly make small precise adjustments to this rate.

Experiments made using flow control valves which change the cross-sectional area of the supply conduits produced unpredictable results with slugging at the consolidation nozzle.

SUMMARY OF THE INVENTION

In accordance with the present invention, a regulator device for regulating the flow of particulate material comprises:

a first, inlet conduit having an outlet end, a second, outlet conduit generally aligned with the first conduit and having an inlet end sufficiently close to the said outlet end of the first conduit as to be capable of receiving at least a portion of a particulate material flow exiting the outlet end, a chamber surrounding the said inlet end of the second conduit for receiving particulate material which exits the outlet end of the first conduit and is not received into the inlet end of the second conduit, and means for adjusting the area of the inlet end of the second conduit which is exposed to the said outlet end of the first conduit thereby to adjust the flow of particulate entering the second conduit.

The area of the inlet end of the second conduit which is exposed to the outlet end of the first conduit and which receives the material is varied by changing the lateral relationship of the adjacent ends of the two conduits. This includes the case where one of the conduits rotates relative to the other conduit and where the ends are non-circular or where the ends are eccentric to each other. Conveniently, the conduits have a common axis, and the inlet and outlet ends have non-circular cross-sections, so that relative rotation the between the adjacent conduit ends about their common axis alters the proportion of the second conduit inlet end which is exposed to flow of particulate material from the first conduit. The excess material, which goes into the chamber surrounding the inlet end of the second conduit, is passed through a by-pass tube and recycled.

The lateral relationship of the adjacent ends of the conduits can also be changed by shifting one conduit end along a path perpendicular to its axis relative to the other conduit end. This has the advantage over the rotational methods described above in it can include a no-flow condition where all the powder is diverted and recycled.

Preferably, the adjacent ends of the conduits are each in the form of a nozzle having a tip with an elongated cross-section with a major axis and a minor axis, the tips being close together, and the adjusting means causes relative rotation of one conduit relative to the other between a first angular position, in which the cross-sections of the nozzle have their major axes aligned so that the inlet nozzle of the second conduit can receive all, or at least most, of the particulate material exiting the outlet nozzle of the first conduit, and a second position in which one of the nozzles has been rotated about the axis of the second conduit through a substantial angle, up to about a right angle, relative to the other nozzle, whereby flow of particulate material into the inlet nozzle of the second conduit is reduced.

Preferably, the opposed, adjacent nozzles are both of similar elongated cross section, for example of elongated rectangular shape, and each have a major axis which is much larger than the minor axis, for example four, six or ten times larger. In this case, rotating the inlet end nozzle of the second conduit relative to the outlet nozzle of the first conduit by a relatively small amount, for example 10 or 20°, from the aligned condition, will cause a rapid reduction in the flow of material, which may be desirable when the invention is used for the laser consolidation process. When the nozzles are near the 90° position, the adjustment of flow by rotating the nozzles becomes very fine.

Preferably, the first and second conduits are mounted in aligned first and second bores of a valve housing, and means are provided for adjusting the rotational relationship of the two nozzles about the common axis of the bores thereby to adjust the flow of particulate material between a maximum flow position where the cross-sections of the nozzles are in rotational alignment, and a minimum flow position at a substantial angle to the first position, usually about 90°. The means for adjusting may be a handle projecting laterally from the housing which is rotated by hand. Alternatively, the means for adjusting may be a motor controlled by a computer which also controls the operation of the consolidation process.

Preferably, the regulator is used with a carrier gas for the particulate material, as is conventional in powder delivery systems. When used with a carrier gas, the regulator of this invention has the advantages over many other systems in that firstly the flow of powder and of the gas remain in a constant proportion as the flow of powder is reduced, and in that secondly the speed and momentum of the carrier gas are not much affected by the adjustment to flow.

The regulator of this invention can be fairly small and compact, and can be made suitable for mounting close to or on the consolidation head which carries the laser and a tube delivering the powder and carrier gas to the workpiece being built or repaired. Accordingly, in accordance with another aspect of the invention, the regulator of this invention is carried by the consolidation head, or by a carrier which also supports the consolidation head, and is connected via a conduit to a conventional gas transport system which is situated close to a powder feed hopper. This allows for rapid and accurate adjustment of the powder feed rate as is required by the consolidation process.

The regulator of this invention does require an input flow rate which is constant. To achieve this, the regulator can be used in series with another, similar regulator on the input side, to give a yet further improvement in regulation.

In accordance with another aspect of the invention, a method for regulating the flow of particulate material comprises:

feeding the material and a carrier gas through a first conduit to exit at an outlet end thereof;

receiving a part of the material and gas into an inlet end of a second conduit which is generally aligned with the first conduit, the said ends being sufficiently adjacent for the second conduit to receive at least a portion of the material and gas exiting the first conduit; and adjusting the lateral relationship of the adjacent ends of the conduits so that the amount of material flowing into the second conduit is adjusted, while recycling the material leaving the first conduit, and which does not flow into the second conduit, back to a supply source.

BRIEF DESCRIPTION OF THE DRAWINGS

Preferred embodiments of the invention will now be described by way of example with reference to the accompanying drawings, in which.

DETAILED DESCRIPTION

Figures 1, 1A:
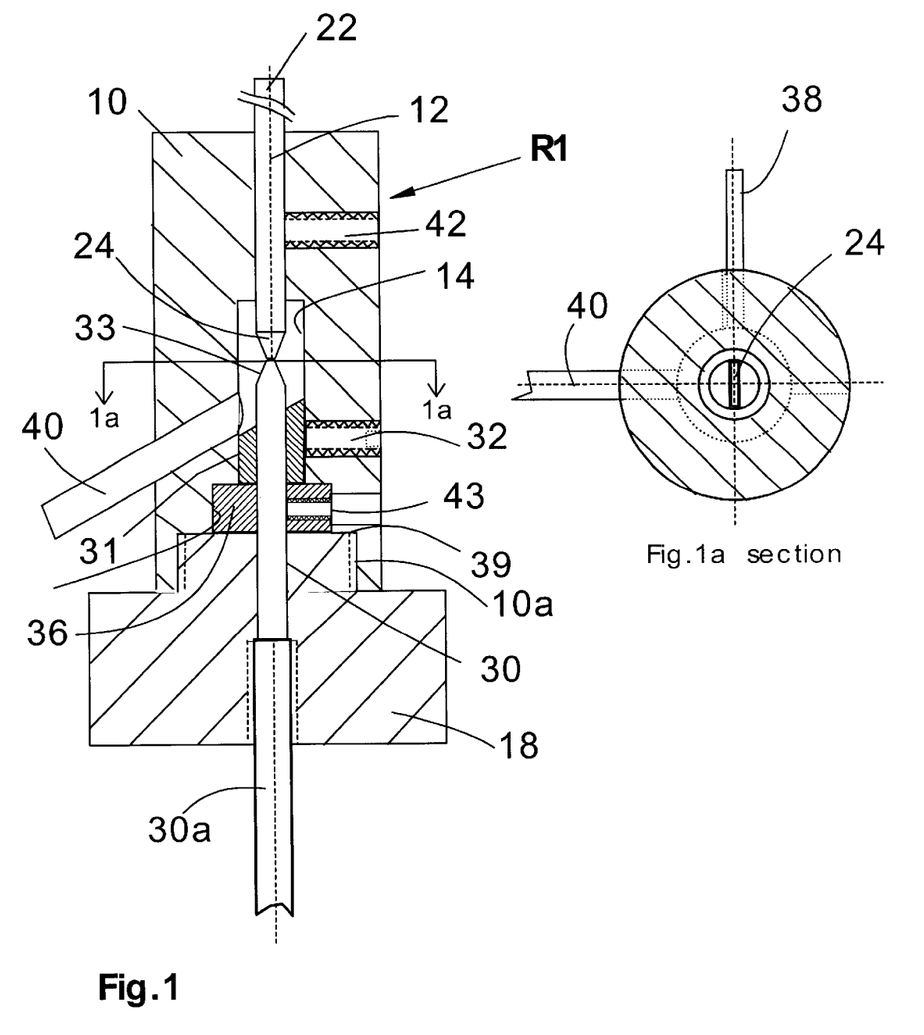
FIG. 1 shows a longitudinal section through the device of the invention.
FIG. 1a is a sectional view on lines 1a—1a of FIG. 1 showing the adjacent nozzles in the aligned position of FIG. 1.
Figures 2, 2A:
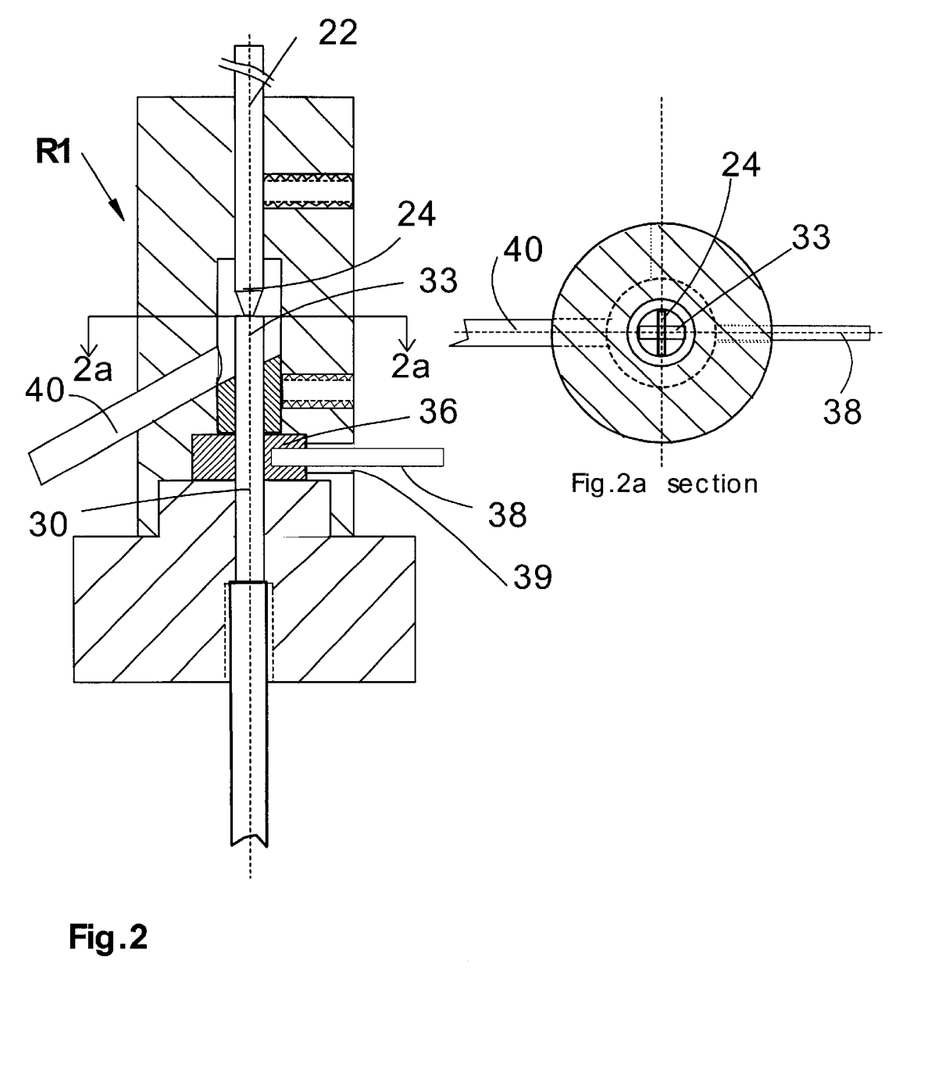
FIG. 2 shows a similar section through the same device, with the parts in a different position.
FIG. 2a is a sectional view on lines 2a—2a of FIG. 2 showing the nozzles in the FIG. 2 position.

Referring to FIGS. 1 and 2, these show a first regulator R1 which has a metal housing 10 with a first, upper bore 12 which leads into an enlarged, cylindrical chamber 14. Below this chamber is a short cylindrical recess 16 of larger diameter than the chamber, which chamber is closed by a base 18 which has screw threaded engagement with a lower end skirt 10a of the housing. The base 18 has a second, lower bore which is axially aligned with, and is the same diameter as, the upper bore 12.

The upper bore 12 receives a first, inlet conduit 22 having a passageway leading to an outlet nozzle 24 which is fitted into the outlet end of the conduit. An upper portion of an outlet conduit 30, similar to the inlet conduit 22, is rotatably held within an axial bore in a spacer member 31 fitted into the lower end portion of the cavity 14 and held by a set screw 32. This outlet conduit has an inlet end nozzle 33 similar to and adjacent to the nozzle 24. A lower portion 30a of the outlet conduit 30 passes out of the device through the base 18, being rotatable relative to this base. The conduit 30 has an upper portion held to rotate with a disc-like rotator 36 which is rotatable within the recess 16 by a handle 38 which extends into a lateral bore in the side of the rotator, with the handle projecting radially out of the housing and being movable in a slot 39.

The upper surface of the spacer 31 which faces the inlet conduit slopes down to a port connected to a downwardly sloping recycle or by-pass tube 40 by which powder is returned to the supply hopper (not shown).

Figure 3:
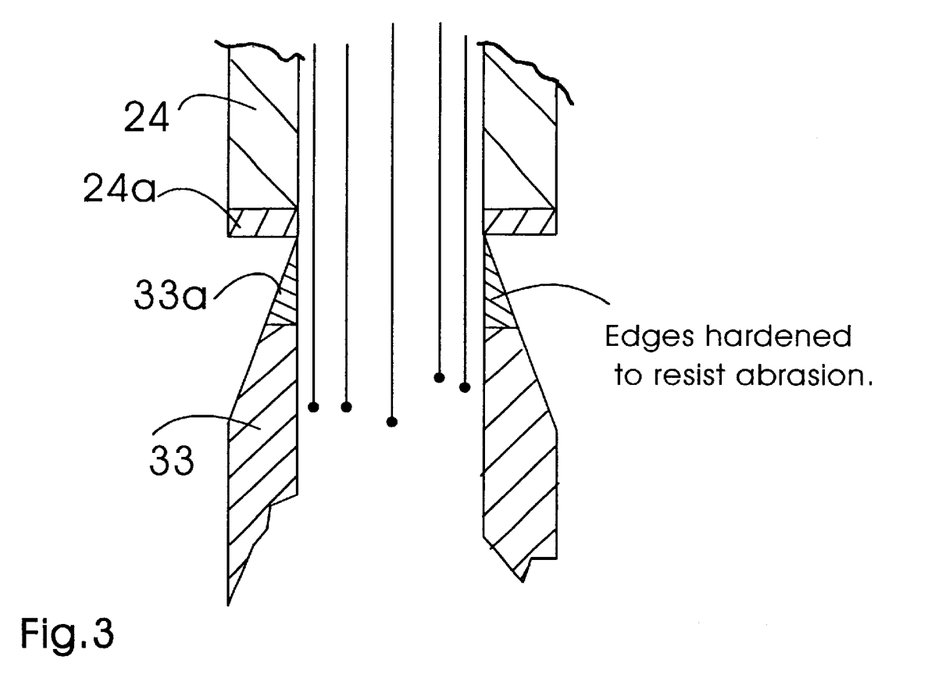
FIG. 3 is a diagrammatic representation showing an enlarged view of a longitudinal section close to the junction between the adjacent ends of the nozzles in the aligned, FIG. 1 position.
Figure 4:
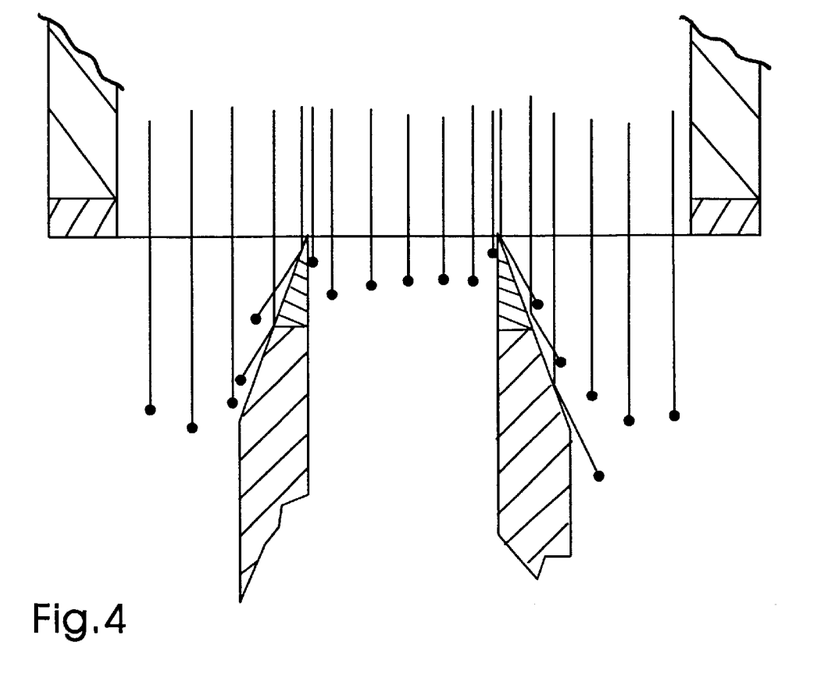
FIG. 4 is a view similar to FIG. 3 with the nozzles in the FIG. 2 position.

The outlet and inlet nozzles 24 and 33 are similar, and each has an outlet/inlet port or tip which is elongated in cross-sectional shape. As shown in FIG. 1a, the shape is preferably in the form of a rectangle having a major axis at least five times its minor axis, and preferably about 8 to 15 times as long as the minor axis. The rectangular opening of the lower, inlet nozzle 33 is slightly larger than that of the upper, outlet nozzle 24. In one suitable construction, the upper nozzle 24 has an opening of 0.008 inch width (minor axis) and 0.127 inch length (major axis), while the lower nozzle 33 has a width of 0.013 inch and a length of 0.135 inch. As shown in FIGS. 3 and 4, the lower end 24a of the outlet nozzle 24, and the upper end 33a of the inlet nozzle 33, are made of carbide to resist erosion, and the upper edges of the nozzle 33 are bevelled to form a sharp, blade-like edge at the top of the nozzle, capable of diverting powder when the nozzles are mis-aligned as in FIG. 4.

As indicated in FIG. 2, the first conduit 22 is normally held against rotation by a set screw 42, and the lower conduit 30 is held in relation to the rotator 36 by a set screw 43. These set screws are used for initially adjusting the device so that the movement of the rotator 36 by handle 38 moves the nozzles between an aligned condition, as shown in FIGS. 1, 1a and 3, and a 90° misaligned condition as shown in FIGS. 2, 2a and 4.

Figure 5:
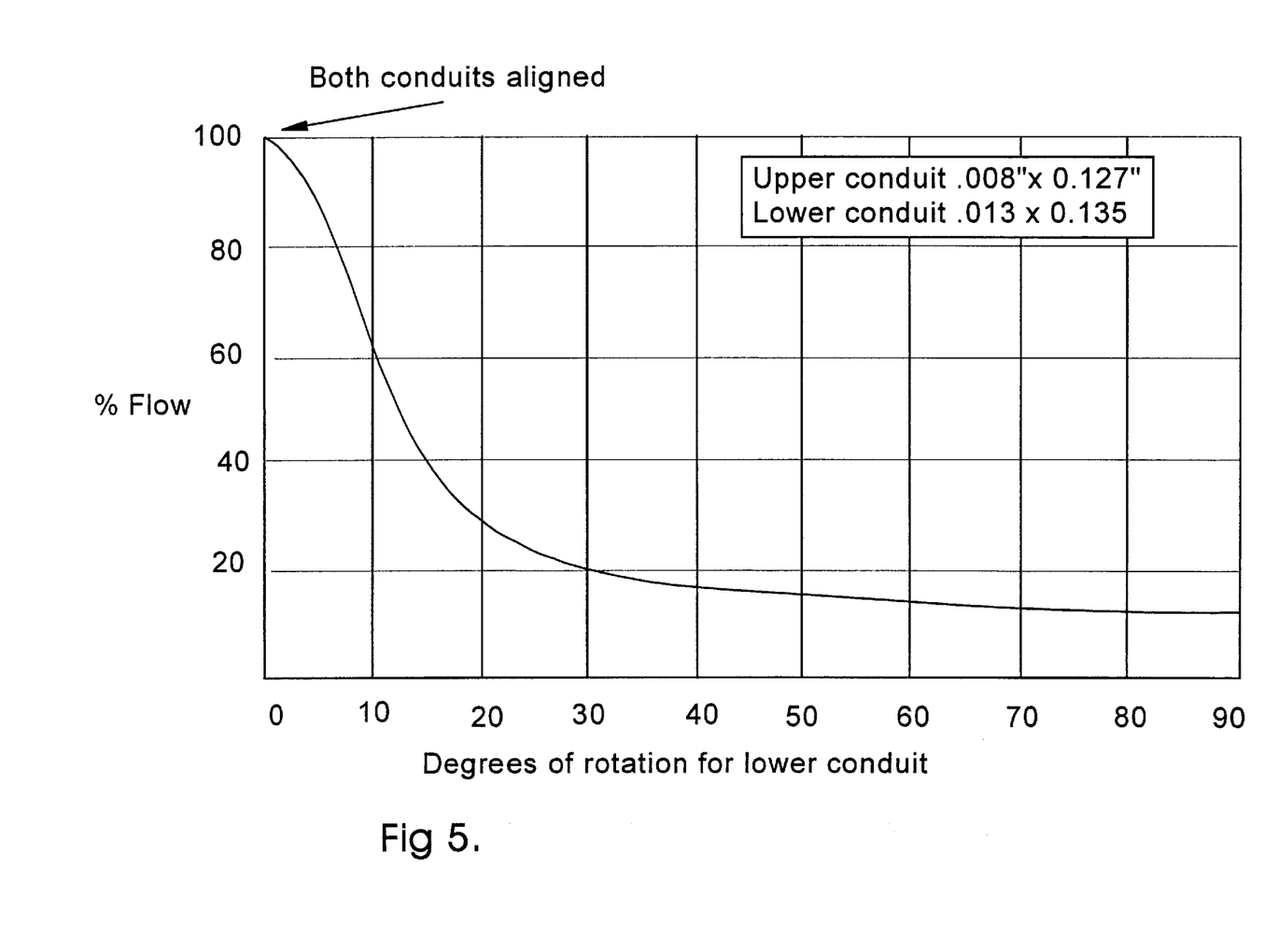
FIG. 5 is a graph showing the relationship between flow of powder and rotational adjustment of the second conduit.

In operation, inlet conduit 22 is connected to a powder source such as a conventional powder feeder that delivers the powder carried by a stream of carrier gas, or which is fed by an auger. When the nozzles are aligned, as shown in FIGS. 1, 1a, and with their inner surfaces co-planar as shown in FIG. 3, the powder flows essentially unimpeded from the upper nozzle 24 to the lower nozzle 33. When the lower nozzle is rotated by the handle 38 from the aligned position, the powder flow rate reduces rapidly, with much of the powder going outside the nozzle 33 as indicated in FIG. 4, the reduction of flow rate being shown by the graph of FIG. 5. This rapid reduction is ideal for the laser consolidation process. On the other hand, fine control of powder flow can be achieved at near to the 90° or minimum flow condition. In all cases, powder leaving the upper nozzle which does not go into the lower nozzle is recycled through the by-pass tube 40 back to the powder source. The reduced powder flow leaving the conduit 30 is matched by a proportionally reduced flow of carrier gas.

The powder flowing into the lower nozzle passes through conduit 30 and is delivered via feed tube to the consolidation process. When the powder is transported from the original powder feeder by a gas transport system the velocity of the particles can be such that the device may be used in orientations different from that shown.

Figure 6:
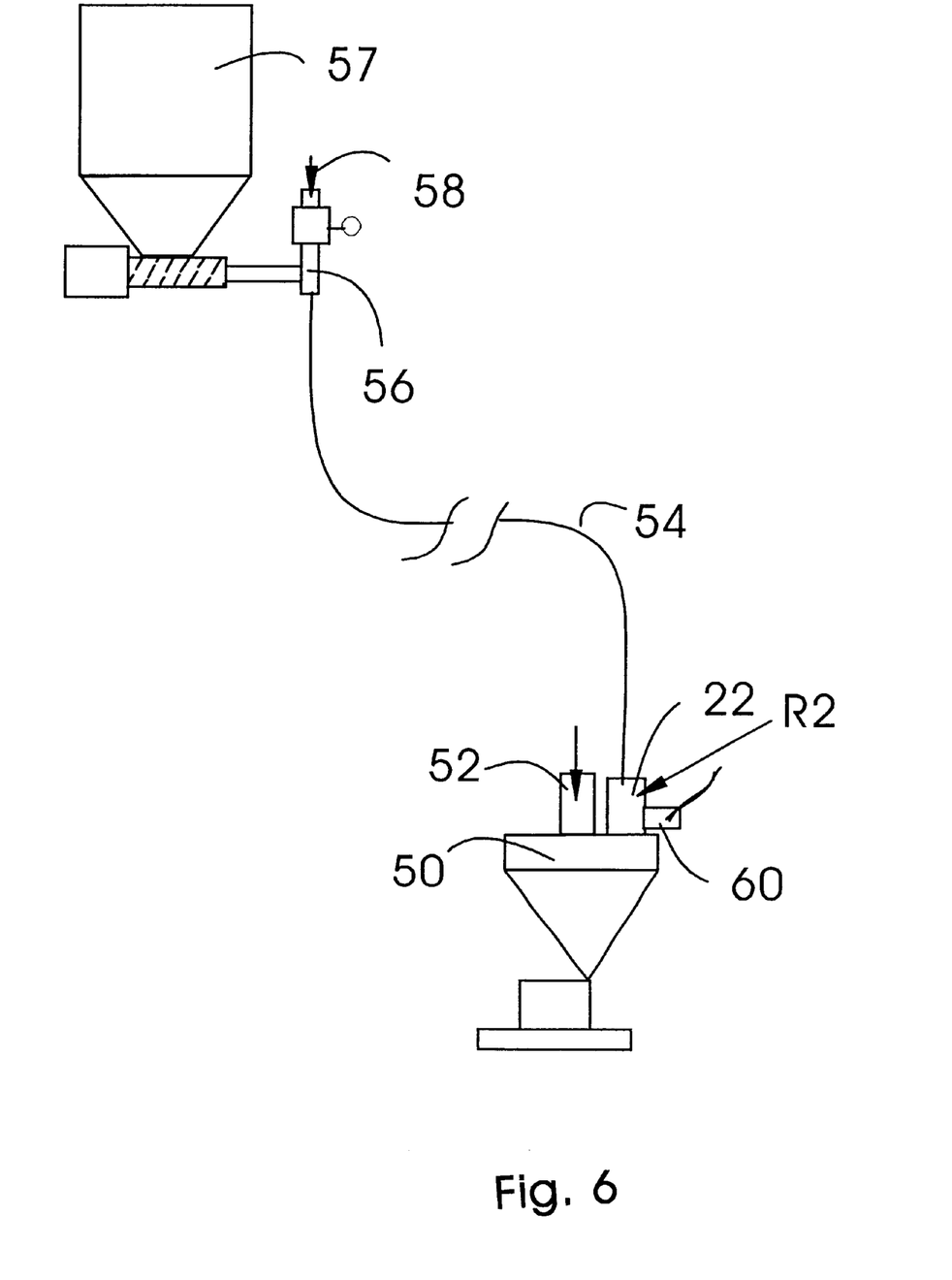
FIG. 6 is an overall view of a consolidation apparatus incorporating the regulator device of this invention.

The device is compact and simple, and this enables it to be mounted on a consolidation head, or adjacent to such a head. The former arrangement is shown in FIG. 6, where a similar regulator R2 is mounted on the top of a consolidation head 50, adjacent to a laser input tube 52. The regulator R2 has its inlet conduit 22 connected to a powder and carrier gas supply tube 54, which leads from a conventional regulator 56 associated with a powder hopper 57 and with a carrier gas supply 58. In this case the regulator is modified, as compared to regulator R1, by replacement of the hand control 38 with a computer-controlled rotator motor 60 which is connected to a CNC (computer numerical control) system which gives automatic control of the consolidation process.

Figure 7:
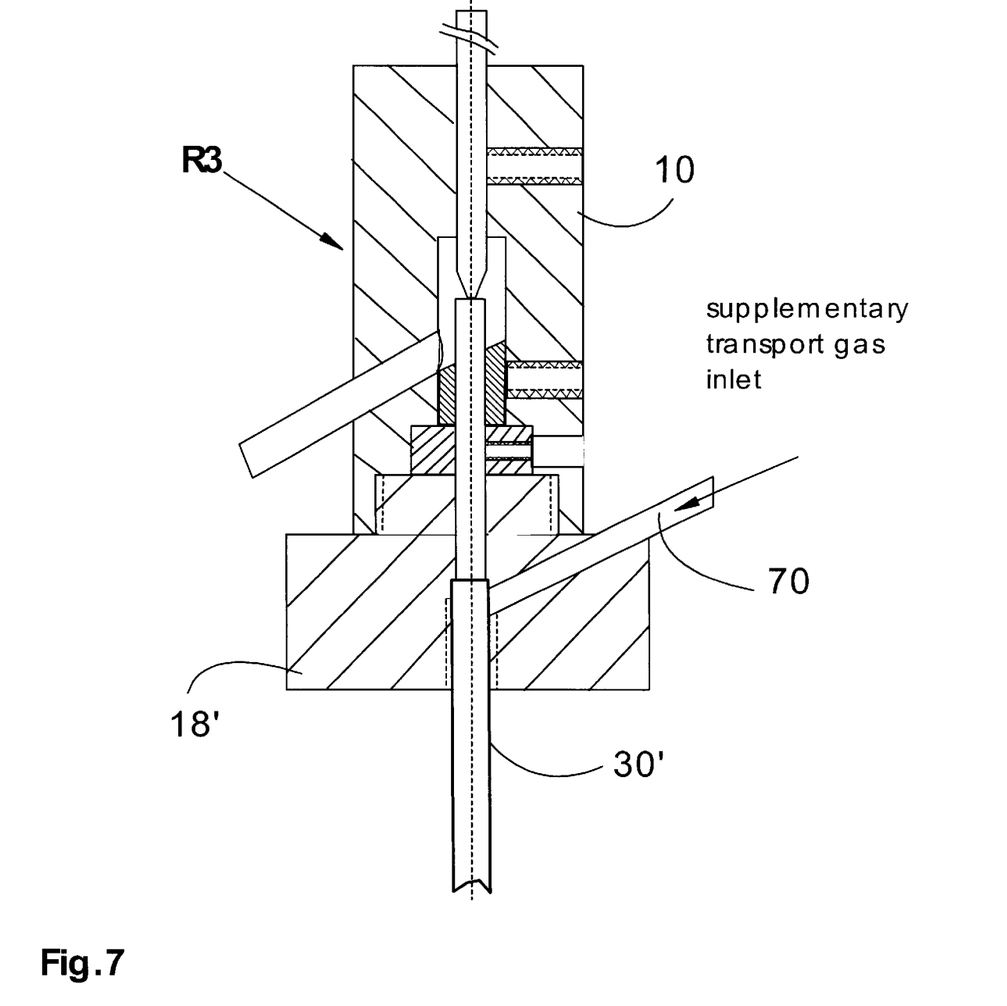
FIG. 7 is a view similar to FIG. 1 of a modified device.

Once the powder enters the lower or second nozzle and conduit, additional gas can be introduced at a suitable angle to increase the particle velocity; this may be necessary in case the adjustment of the regulator strips off so much gas that there is insufficient to carry the powder to the melt pool. Addition of gas is shown in FIG. 7, showing a regulator R3 which has been modified so that its base 18' can accommodate a side tube 70 which provides supplemental carrier gas. This supplemental gas joins the powder and gas flow in the conduit 30' at an oblique angle so that the supplemental gas has a component in the flow direction through this conduit.

Figure 8:
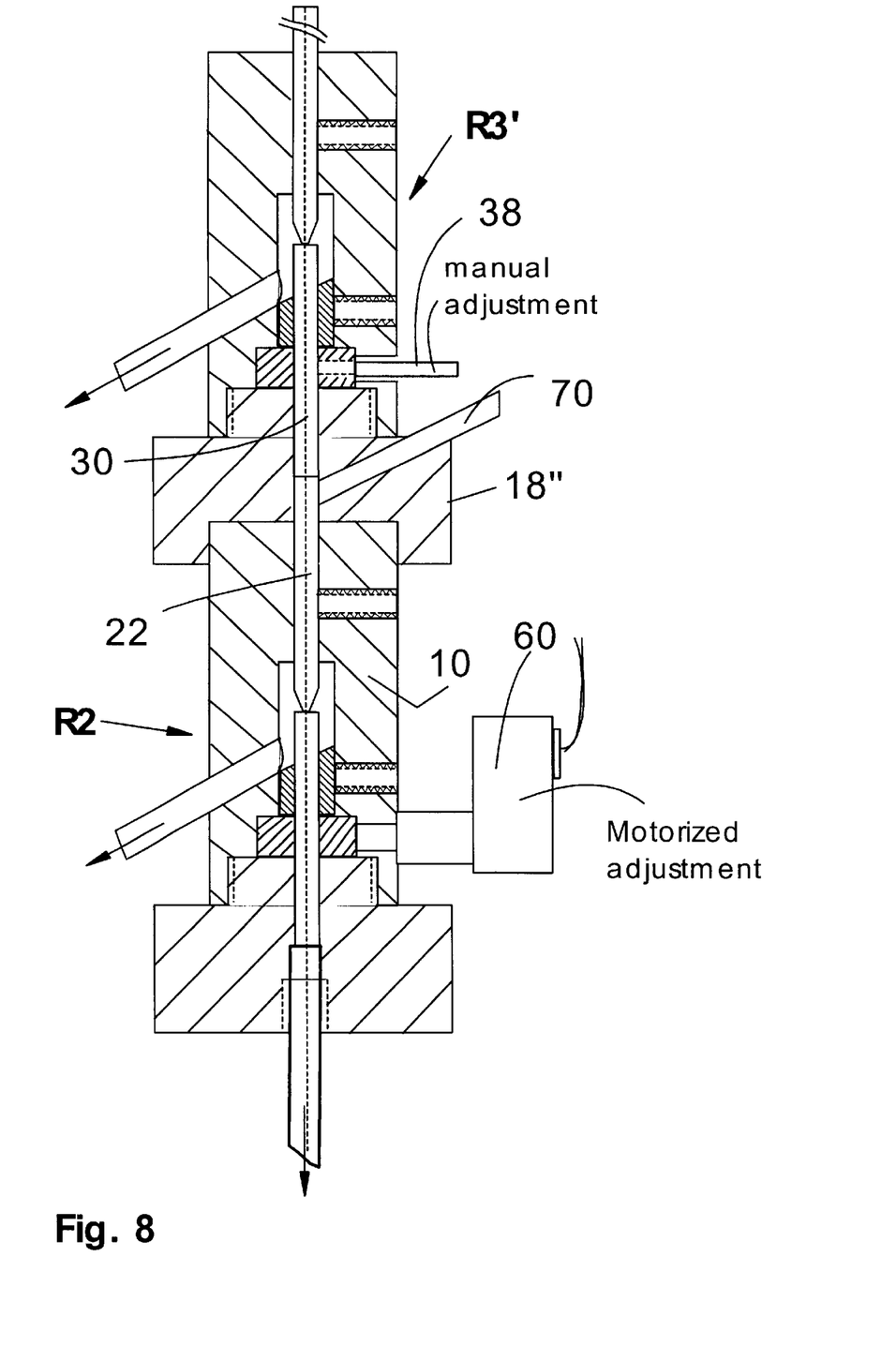
FIG. 8 is a view, similar to FIG. 1, showing two similar devices connected together in series.

FIG. 8 shows how two regulators R3' and R2 as described previously can be connected in series to give even better control of powder flow. Here, a first regulator R3', similar to that shown as R3, is mounted on the top of a second regulator R2 which is identical to that described as R2 above. The mounting is achieved by providing the regulator R3' with a recess in the lower end of its base 18" which recess receives the upper end of the body 10 of the regulator R2. The outlet conduit 30 of the first regulator R3' is directly connected to the inlet conduit 22 of the second regulator R2. The first regulator R3' has the handle 38 for manual adjustment, and the second regulator R2 has the computer controlled motorized adjuster 60.

Another way in which two regulators may be connected in series is to mount a first regulator close to the powder feeder to reduce the flow rate to the nominal required for the process. This reduces the powder feeder flow rate to a value that is comfortable for the powder feeder, and then uses the second regulator to bring this to the rate required by the consolidation process. The second regulator would be smaller and mounted very close to the consolidator nozzle and would be used to make minor flow adjustments as required for the consolidation process.

Particular advantages of this system are the compactness and simplicity, and the ability to achieve both fast response and slow response for the fine regulation of flow. In the laser consolidation process, this means that very small changes to part dimensions can be made in milliseconds. The regulator of FIG. 8, i.e. with two stages, is suitable for consolidation processes which have to use flow rates as low as 0.05 cc/min; and where there is a need to vary this during processing by a few percentage points.

What is claimed is:

1. A device for regulating the flow of particulate material, comprising:

a first, inlet conduit having an outlet end, a second, outlet conduit generally aligned with the first conduit and having an inlet end sufficiently close to the said outlet end of the first conduit as to be capable of receiving at least a portion of a particulate material flow exiting said outlet end, a chamber surrounding the said inlet end for receiving particulate material which exits the outlet end of the first conduit and is not received into the inlet end of the second conduit, and means for adjusting the lateral relationship of the said inlet end of the second conduit to the said outlet end of the first conduit to change the area of the said inlet end exposed to the said outlet end thereby to adjust the flow of particulate material through the second conduit, wherein the conduits have common or parallel axes, and at least one of the inlet or outlet ends has a non-circular cross-section, and wherein said adjusting means causes relative rotation between the said ends about an axis parallel to that of the second conduit such as to alter the proportion of the second conduit inlet end which is exposed to flow of particulate material from the first conduit.

2. A device according to claim 1, wherein said outlet and inlet ends are each in the form of a nozzle having an elongated cross-section with a major axis and a minor axis, and wherein said adjusting means causes relative rotation of the nozzles between a first angular position in which the cross-sections of the nozzles have major axes which are aligned and in which the inlet end nozzle of the second conduit can receive at least most of the particulate material exiting the outlet end nozzle of the first conduit, and a second position in which one of the nozzles has been rotated about the axis of the second conduit through a substantial angle relative to the other nozzle, whereby flow of particulate material into the inlet nozzle of the second conduit is reduced.

3. A device according to claim 2, wherein the elongated cross-sections of the nozzles both have a major axis at least four times the dimension of the minor axis.

4. A device according to claim 2, wherein the elongated cross-sections of the nozzles both have a major axis at least six times the minor axis.

5. A device for regulating the flow of particulate material, comprising:

a valve housing having aligned first and second bores, a first, inlet conduit mounted in said first bore and having an outlet end nozzle with an elongated cross section which has a major and a minor axis, a second, outlet conduit rotatably mounted in said second bore for rotation about the axis of the second conduit and generally axially aligned with the first conduit, and having an inlet end nozzle of elongated crass section, said nozzles being sufficiently close to each other that said inlet end nozzle of the second conduit can receive at least a portion of a particulate material flow exiting said outlet end nozzle of the first conduit, a chamber formed in said valve body and surrounding the said inlet end nozzle of the second conduit for receiving particulate material which exits the outlet end nozzle of the first conduit and is not received into the inlet end nozzle of the second conduit, and means for adjusting the rotational relationship of the said inlet end nozzle to the said outlet end nozzle about the axis of at least one of the said bores, thereby to adjust the flow of particulate material between a maximum flow position where the cross-sections of the nozzles are in rotational alignment, and a minimum flow position at a substantial angle to the first position.

6. A device according to claim 5, wherein the means for adjusting is a handle projecting laterally from said valve body for rotating one of said conduits.

7. A device according to claim 5, wherein the means for adjusting is a computer controlled motor drivingly connected to one of said conduits.

8. A device according to claim 5, wherein the elongated cross-sections of the nozzles each have a major axis at least four times the dimension of its minor axis.

9. A device according to claim 5, wherein the elongated cross-sections of the nozzles each have a major axis at least six times the dimension of its minor axis.

10. A device according to claim 5, wherein the cross sections of the nozzles are in the form of elongated rectangles.

11. A device according to claim 5, wherein the first conduit is connected to a source of particulate material, and wherein said chamber is also connected to the source of particulate material through a by-pass tube.

12. A device according to claim 1, in combination with a consolidation head for performing a laser consolidation process with the particulate material which is in the form of a metal powder, in which the device is carried adjacent the consolidation head which also carries a laser for performing the laser consolidation process, the device having its inlet conduit connected to a source of the metal powder and having its outlet conduit connected to a tube mounted on said head for supplying the powder for the process.

13. A device according to claim 1, having its inlet conduit connected to the outlet conduit of another, similar device, so that the two devices are connected in series.

14. A method for regulating the flow of particulate material comprising:

feeding the material with a carrier gas through a first conduit to exit at an outlet end thereof;

receiving a part of the material into an inlet end of a second conduit which is generally aligned with the first conduit, the said ends being sufficiently adjacent for the second conduit inlet end to receive at least a portion of the material exiting the first conduit outlet end; and adjusting the lateral relationship of the adjacent ends of the conduits so that the amount of material flowing into the second conduit is adjusted, while recycling the material which does not flow into the second conduit back to a supply source.

15. A method according to claim 14, wherein said particulate material is a metal powder.

16. A method according to claim 15, wherein the method forms part of a laser consolidation process, said powder being fed from the second conduit into a laser consolidation head.

17. A device for regulating the flow of particulate material, comprising:

a first, inlet conduit having an outlet end, a second, outlet conduit generally aligned with the first conduit and having an inlet end sufficiently close to the said outlet end of the first conduit as to be capable of receiving at least a portion of a particulate material flow exiting said outlet end, a chamber surrounding the said inlet end for receiving particulate material which exits the outlet end of the first conduit and is not received into the inlet end of the second conduit, and means for adjusting the lateral relationship of the said inlet end of the second conduit to the said outlet end of the first conduit to change the area of the said inlet end exposed to the said outlet end thereby to adjust the flow of particulate material through the second conduit, wherein the first conduit is connected to a source of particulate material and of a carrier gas, and wherein said chamber is also connected to the source of particulate material through a by-pass tube.

18. A device according to claim 17, wherein the conduits have common or parallel axes, and at least one of the inlet or outlet ends has a non-circular cross-section, and wherein said adjusting means causes relative rotation between the said ends about an axis parallel to that of the second conduit such as to alter the proportion of the second conduit inlet end which is exposed to flow of particulate material from the first conduit.

* * * * *